United States Patent Office 2,914,553
Patented Nov. 24, 1959

2,914,553
ALCOHOLYSIS OF AROMATIC CARBOXYLIC ACID AMIDES WITH POLYHYDRIC ALCOHOLS

Edward James Gasson and David James Hadley, Epsom Downs, England, assignors to The Distillers Company Limited, Edinburgh, Scotland, a British company No Drawing. Application September 12, 1956
Serial No. 609,351

Claims priority, application Great Britain September 22, 1955

9 Claims. (Cl. 260—475)

The present invention relates to the production of esters of aromatic carboxylic acids with aliphatic polyhydric alcohols.

According to the present invention the process for the production of aromatic carboxylic acid esters comprises contacting an aromatic carboxylic amide with an aliphatic polyhydric alcohol in the presence of an alkaline catalyst at an elevated temperature whilst continually removing the liberated ammonia.

A wide variety of aromatic carboxylic amides may be used in the process of the present invention. These include benzamide, toluamide, naphthoamide, nicotinamide, phthalamide, isophthalamide, terephthalamide and the like.

The aliphatic polyhydric alcohols which can be used in the process of the present invention include dihydric alkanols such as ethylene glycol, propylene glycol and butylene glycol, trihydric alkanols such as glycerol, and diethylene glycol.

The proportions of the reactants may vary within moderately wide limits, but it is preferred to employ a slight excess of polyhydric alcohol over the stoichiometric proportion. In the case of diamides such as terephthalamide it is therefore preferred to employ slightly more than 2 moles of polyhydric alcohol per mole of amide.

The esterification is preferably carried out by heating the reactants at the temperature of reflux of the mixture, although higher or lower temperatures may be used if desired, while continuously removing the liberated ammonia by distillation. The reaction is promoted by the presence of an alkaline catalyst such as the alkali and alkaline earth metal hydroxides, carbonates and bicarbonates. Other catalysts which may be used include magnesium, litharge, magnesia, zinc borate and alcoholates such as sodium methoxide.

An inert gas such as nitrogen is desirably passed through the reaction mixture during the esterification process to assist in the removal of the ammonia formed during the reaction.

On completion of the reaction the excess alcohol, if any, may be removed from the reaction mixture by distillation, preferably under reduced pressure, and the esters may be recovered by conventional fractional distillation or crystallisation techniques.

In the case of the reaction of diamides, such as terephthalamide, with polyhydric alcohols the diesters formed readily condense to form linear polyesters, e.g. polyethylene terephthalate. Some condensation may occur during the esterification process and the product can be further condensed to any desired molecular weight by continuing to heat the reaction mixture under reduced pressure, after removal of excess polyhydric alcohol, for instance at 280° C. and less than 1 mm. Hg. The polymer is then allowed to cool and on solidifying may be comminuted into a form suitable for further treatment.

The following examples are given further to illustrate the process of the invention. In the examples all parts are by weight.

Example 1

Terephthalamide (10 parts), ethylene glycol (50 parts) and magnesium oxide (0.05 part) were heated under reflux at 195° C. in a slow stream of nitrogen. The liberated ammonia was trapped in dilute acid and estimated at intervals. The reaction was complete in seven hours, when the ammonia liberated totalled two moles per mole of terephthalamide taken. Removal of the excess glycol by distillation at 10 mm. pressure left a residue consisting of glycol terephthalate polymers of low molecular weight, admixed with the monomer. The yield of ester was 15.7 parts by weight. By fractional crystallisation from alcohol a fraction was isolated which consisted principally of the dimer, M.P. 140–150° C.

Found, saponification value, 121; OH, 7.2%; $C_{22}H_{22}O_{10}$ requires saponification value, 111.5; OH, 7.6%.

Example 2

Benzamide (10 parts), ethylene glycol (50 parts) and magnesium oxide (0.1 part) were heated under reflux at 195° C. in a slow stream of nitrogen for 22 hours. The ammonia evolved amounted to 98% of the quantity theoretically obtainable from the benzamide used. Excess glycol was distilled at 10 mm. pressure, and the residue fractionated at 2 mm. pressure. Ethylene glycol monobenzoate was obtained as a fraction boiling at 116–117° C. at 2 mms., solidifying on cooling to a white crystalline solid M.P. 40° C.

Example 3

Terephthalamide (10 parts), glycerol (300 parts) and magnesium oxide (0.1 part) heated under nitrogen at 200° C. for 48 hours, liberated ammonia equivalent to 99% of the terephthalamide taken. Distillation of the excess glycerol at 2 mm. pressure left as residue, a viscous liquid consisting of a mixture of glycerol terephthalate polyesters.

Example 4

Isophthalamide (5.0 parts), ethylene glycol (27.8 parts) and sodium methoxide (0.05 part) were heated under reflux at 195° C. in a slow stream of nitrogen which continuously removed the ammonia evolved. Evolution of ammonia was substantially complete after 48 hours. The resulting clear solution was distilled at 20 mm. to half its volume and on cooling a white solid was deposited which was recrystallised from acetone/petroleum ether to give material of melting point 141° C.

Saponification equivalent:

Found=125
Theoretical for di-(2-hydroxyethyl)isophthalate=127

The esters produced in the process of the present invention are valuable high boiling organic solvents and intermediates in the production of linear polyester resins, such as polyethylene terephthalate, known commercially under the trade names "Terylene" and "Dacron," and alkyd resins.

We claim:

1. The process for the production of an ester of an aromatic carboxylic acid which comprises heating to a temperature at which ammonia is liberated an aromatic carboxylic amide selected from the group consisting of benzamide, phthalamide, isophthalamide and terephthalamide with an aliphatic polyhydric alcohol having 2 to 3 hydroxyl groups in the presence of an alkaline catalyst while continually removing liberated ammonia.

2. The process of claim 1 in which the aromatic carboxylic amide is a phthalamide.

3. The process of claim 1 in which the aliphatic polyhydric alcohol is ethylene glycol.

4. The process of claim 1 in which the aliphatic polyhydric alcohol is propylene glycol.

5. The process of claim 1 in which the aliphatic polyhydric alcohol is butylene glycol.

6. The process of claim 1 in which the aliphatic polyhydric alcohol is glycerol.

7. The process of claim 1 in which the alkaline catalyst is selected from the group consisting of the alkali and alkaline earth metal hydroxides, carbonates and bicarbonates.

8. The process of claim 1 in which the heating is continued under reduced pressure to form a non-resinous linear polyester while continually removing excess alcohol.

9. The process of claim 8 in which the aromatic carboxylic amide is terephthalamide and the aliphatic polyhydric alcohol is ethylene glycol.

References Cited in the file of this patent

UNITED STATES PATENTS

| 1,584,907 | Trusler | May 18, 1926 |
| 2,495,567 | Carmack | Jan. 24, 1950 |
| 2,809,208 | Miller et al. | Oct. 8, 1957 |

FOREIGN PATENTS

| 592,106 | Great Britain | Sept. 8, 1947 |

OTHER REFERENCES

Groggins: "Unit Processes in Organic Synthesis"; pp. 620–621 (1952).